COLOR DEMODULATOR FOR TELEVISION RECEIVERS
Filed Aug. 15, 1966
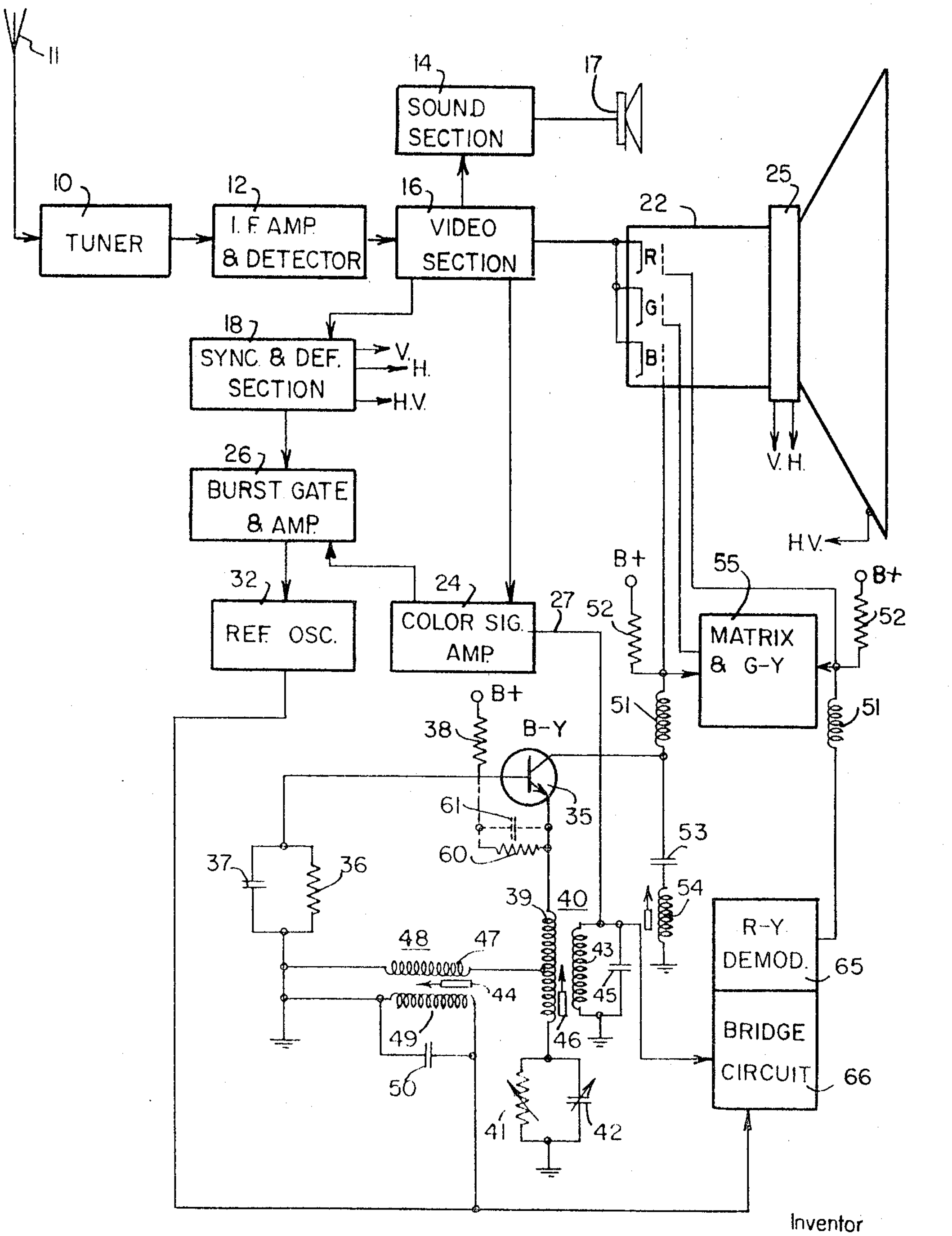
Inventor
ROLF E. SPIES
BY
Mueller, Aichele & Rauner
ATTYS.

United States Patent Office 3,465,093
Patented Sept. 2, 1969

3,465,093

COLOR DEMODULATOR FOR TELEVISION RECEIVERS

Rolf E. Spies, Lyons, Ill., assignor to Motorola, Inc., Franklin Park, Ill., a corporation of Illinois Filed Aug. 15, 1966, Ser. No. 572,528
Int. Cl. H04n 5/38, 5/44
U.S. Cl. 178—5.4 10 Claims

ABSTRACT OF THE DISCLOSURE

A half-wave transistorized demodulator uses a transistor with the emitter-base path connected in one arm of a four-arm balanced bridge circuit. The composite color input signals are applied to one diagonal of the bridge, with the 3.58 reference oscillator signal being applied to the other diagonal thereof. Two of the arms of the bridge comprise the center tapped secondary winding to which the color signals are applied. The fourth arm of the bridge includes an RC network which is adjusted to match the RC characteristics of the first arm of the bridge in which the emitter-base path of the transistor is connected. When the bridge is balanced, the signal appearing on the collector of the transistor is the desired demodulated color signal, while undesirable coupling of the input signals is minimized.

Demodulator circuits using semiconductors for demodulating suppressed carrier multiplex signals can often be operated only to derive low level output signals in order to minimize interaction between the reinserted carrier and the modulated signal. Accordingly, an output signal amplifier may be necessary for the demodulated signal to obtain necessary signal amplitude while avoiding cross coupling.

It is an object of this invention to provide an inexpensive high signal level transistorized color signal demodulator with a minimum of parts and wherein the reference and chrominance signals are well isolated.

It is another object to provide a circuit with a single transistor into which two independent signals can be fed independently without disturbing each other.

A feature of the invention is the provision of a bridge circuit driving a demodulator with two transistor input electrodes connected as one branch of the bridge and with one signal source coupled across one diagonal and the other signal source coupled across the other diagonal of the bridge.

A specific form of the invention utilized for a half-wave color demodulator comprises a transistor, the base electrode of which is connected through a first resistor-capacitor network to a reference potential. The emitter electrode of the transistor is connected to the secondary winding of a first transformer, the primary winding of which is connected to a chrominance signal source. The secondary winding of the first transformer has a center tap and an end terminal connected through a second resistor-capacitor network to the reference potential. The center tap is connected to the primary winding of a second transformer, the secondary winding of which is connected to the reference signal source. The input impedance of the transistor and the second resistor-capacitor network and the secondary winding of the first transformer provide on each side of its center tap the four branches of a bridge. Since the chrominance signal source is coupled by the inductance of the first transformer to the bridge through one diagonal and the reference signal source is coupled by the inductance of the second transformer to the bridge through the other diagonal, both the signals are independently applied to the transistor when the bridge is balanced. For balancing the bridge adjustable cores are provided for varying the inductance of the transformers and the one resistor-capacitor network is made variable.

The invention is illustrated in the drawing which shows partly in block and partly schematic a color television receiver having two color demodulators according to the invention.

The color television receiver in the drawing comprises a tuner 10 connected to an antenna 11. The tuner selects a television signal and converts it to an intermediate frequency (IF) to be further amplified in the IF amplifier and detector 12. A sound subcarrier of the signal is selected and coupled to a sound section 14 to be demodulated and amplified for operating the loudspeaker 17.

A composite color signal is further coupled to a video section 16. The output of the video section is a video signal which is coupled to picture tube 22 which may be a three-beam color tube or some other suitable color picture tubes. A video signal developed in the video section 16 is also coupled to synchronizing and deflection section 18, where the synchronizing signal is removed and deflection signals generated. These deflection signals comprise vertical and horizontal sawtooth sweep signals at the vertical and horizontal deflection frequencies (60 c.p.s. and 15.75 kc. respectively) which are applied to the magnetic deflection yoke 25 on the neck of the three-beam color cathode ray picture tube 22 to sweep the electron beam therein. A gating pulse at the horizontal deflection frequencies is also developed by the synchronizing and deflection section 18 and is coupled to the burst gate and burst amplifier stage 26.

A color signal amplifier 24 serves to amplify the chroma modulation information in the form of the modulation of a 3.58 megacycle suppressed color subcarrier signal applied from the video section 16 to the color signal amplifier 24. The chroma portion of the composite television signal and the color synchronizing signal are separated from the composite television signal in the color signal amplifier 24. The chroma signals are applied through lead 27 to B–Y and R–Y color demodulators whereas the synchronizing signal is applied to the reference oscillator 32. A gating pulse at the horizontal deflection frequency is applied to the burst gate from the synchronizing and deflection section 18 so that the gate will be amplifying during the reference burst signal interval extracting the burst signal needed for reference carrier synchronization. Accordingly, there is a correction voltage applied to the reference oscillator 32 with frequency and phase of the color reference burst in the received television signal.

The B–Y color demodulator has basically the same circuitry as the R–Y color demodulator. Therefore, only the B–Y color demodulator will be described. The R–Y color demodulator 65 and the driving bridge circuit 66 are of the same circuitry as the B–Y color demodulator and its driving bridge circuit. They are only adjusted to different phases. The B–Y demodulator comprises a transistor amplifier 35, the base of which is connected through resistor 36 and in parallel through capacitor 37 to ground potential. The base is further connected through resistor 38 to the DC power supply. The value of resistors 38 and 36 is determined to apply a DC bias to the base for determining the desired working point of the transistor 35. The emitter is connected through the secondary winding 39 of a transformer 40 and a parallel connection of resistor 41 and capacitor 42 to the ground potential. Both the resistor 41 and capacitor 42 are adjustable for varying the time constant thus matching the input impedance of the arm of the bridge including the base-emitter path of the transistor 35 and balancing the bridge network with respect to input signals applied across the diagonals thereof. The primary winding 43 of transformer 40 is connected between ground and the color signal amplifier 24 which applies through lead 27 the corresponding chrominance signal to the demodulators respectively. The primary winding is tuned to the frequency of the applied signal by means of capacitor 45. A core 46 is provided in transformer 40 for adjusting the inductance thereof. The secondary winding has a center tap which is connected through the secondary winding 47 of transformer 48 to ground potential. The primary winding 49 is tuned by means of capacitor 50 to the reference frequency of reference oscillator 32 which is applied from the reference oscillator to the demodulator through transformer 48.

The base-emitter impedance of transistor 35 including internal resistor 60 and capacitor 61 is a part of a bridge network. The bridge network includes successively the time constant circuit of this input impedance of transistor 35 along with an adjustable time constant circuit of resistor 36 and capacitor 37, the time constant circuit of resistor 41 and capacitor 42, one-half of the secondary winding 39 and the other half of the secondary winding 39. The one diagonal between the center tap of the secondary winding and ground potential consists of transformer 48. The mutual inductance between winding 39 and winding 43 reflects the impedance of transformer 40 across the other diagonal between transistor 35 and the junction of the secondary winding 39 and the adjustable time constant circuit of resistor 36 and capacitor 37. The balance of the bridge is adjustable by means of the cores 44 and 46 and the variation of the time constant of resistor 41 and capacitor 42. When the bridge is accurately balanced, the reference signal from reference oscillator 32 can be applied through transformer 48 to the demodulator independently of the chrominance signal from color signal amplifier 24. This independence results from the fact that when the bridge is balanced, signals across either of the diagonals of the bridge do not cause any output across the other of the diagonals of the bridge. Since the chrominance signal is applied to one diagonal of the bridge across the two halves of the secondary winding 39 and since the reference signal is applied across the other diagonal of the bridge across the secondary winding 47 of the transformer 48, so long as the bridge is balanced, no undesirable cross-coupling of the signals will be obtained across the diagonals. Balance is provided in the two arms of the bridge including the secondary winding 39 of the transformer 40 by center-tapping this winding, and balance in the other two arms of the bridge is obtained by relative adjustments of the RC circuit including the resistors 41 and 42 and the circuit including the capacitor 37 and resistor 36 connected in the arm of the bridge which includes the base-emitter path of the transistor 35. Thus, the reference and chrominance signals can be fed into the transistor of the demodulator without disturbing each other by coupling effects.

The ratio between the magnitude of the reference signal voltage and the magnitude of the chrominance signal preferably is of the order of 5:1. This ratio is necessary in order to keep the quadrature error small and to establish a fixed input impedance for the circuit. By choosing the reference voltage magnitude to have such a ratio, the input characteristics of the transistor 35 are primarily dependent upon the reference voltage signal, and this signal can be held constant throughout the operation of the device, so that the circuit including the resistor 41 and capacitor 42 may be adjusted to balance the bridge in order to provide the desired operation. With the signals applied in this manner, a maximum output signal is obtained from the collector of the transistor 35 when the reference signal and the chrominance input signals are 180° out of phase. A minimum output signal is obtained from the collector of the transistor 35 whenever there is a 0° phase difference between these two signals.

The demodulated chrominance appears amplified at the collector of transistor 35, and the signal on the emitter of the transistor 35 includes the 3.58 mHz. reference signal and the 3.58 mHz. chrominance signal along with a negligible portion of the detected chrominance signal. Since the base is AC grounded, collector-base feedback is greatly eliminated. The collector is connected through an inductance 51 and a resistor 52 to the DC power supply. The inductance 51 provides together with capacitor 53 and a tunable inductor 54 a trap for 3.58 megacycles. The demodulated chrominance signal from the B–Y demodulator and R–Y demodulator are applied to the blue and red color control grids of the color picture tube 22 and further to a matrix and G–Y amplifier 55. The matrix and G–Y amplifier provide a G–Y signal which is applied to the green color control grid of the picture tube 22.

The coupling circuit according to the invention allows coupling of two input signals in a fashion that minimum influence of one or the other results. It permits the design of a high level transistor color demodulator where an independency between the reference and the chrominance signal is obtained and where the demodulator requires a minimum of parts and no separate amplifier for the demodulated chrominance signal. Since the base of the transistor 35 is AC grounded, any amplitude and phase modulation of the two undemodulated components (chroma components and reference carrier) by means of the demodulated high level chroma signal is eliminated.

It is obvious that the emitter-base connection can be reversed. In this case, the RC combination of resistor 36 and capacitor 37 and also resistor 41 and capacitor 42 have to be adjusted to determine the right characteristics of the transistor 35 and to provide a time constant large enough to bias the transistor for demodulation action. Also the application of the chrominance signal and the reference signal can be reversed so that the chrominance signal is applied across winding 47 and the reference signal is applied across winding 39.

The bridge demodulator according to the invention has the advantage that the grounded base configuration of the demodulator circuit eliminates the feedback of the remaining reference signal appearing at the collector which would otherwise modify the base drive signal in case of a high driving reference signal source.

I claim:

1. A demodulator circuit for demodulating a combination of first and second signals comprising in combination, electron amplification means having first and second input means and an output electrode, first circuit means connected in series between said first input means and a reference potential, second, third and fourth impedance means connected in series between said reference potential and said second input means, said second, third and fourth impedance means providing branches of a balanced bridge network and the impedance from said second input means to the reference potential providing a further branch of the bridge, first signal input means coupled between the junction of said third and fourth impedance means and said reference potential and providing one diagonal of said bridge network, second signal input means coupled between said second input means of said electron amplification means and the junction of said second and said third impedance means providing another diagonal of said bridge network.

2. A demodulator circuit according to claim 1 wherein said first circuit means includes first impedance means connected in series between said first input means and the reference potential.

3. The demodulator circuit according to claim 1 in which said first circuit means and said second impedance means each comprise a capacitor and a resistor connected in parallel and providing the first and second branch of said bridge network, and in which said third and fourth impedance means each comprise an inductor providing the third and fourth branches of said bridge network.

4. The demodulator circuit according to claim 1 in which said first signal input means comprise first tuned inductance means coupled to said one diagonal of said bridge, and in which said second signal input means comprises a second tuned inductance means coupled to said another diagonal of said bridge.

5. A demodulator circuit according to claim 4 in which said first and second tuned inductance means each comprise a transformer, one winding of which is tuned to the frequency of the signal applied through the transformer to said bridge network.

6. The demodulator circuit according to claim 1 in which said electron amplification means comprises a semiconductor device having output circuit means responsive to the demodulated chroma signal.

7. A demodulator circuit according to claim 1 wherein said first signal is a chrominance signal and said second signal is a reference signal.

8. A demodulator circuit according to claim 1 wherein said first signal is a reference signal and said second signal is a chrominance signal, and the impedance of said further branch of the bridge being the internal impedance of said electron amplification means and the impedance of the first circuit means.

9. A color demodulator for quadrature demodulation of a chroma signal comprising in combination, a semiconductor demodulating device having first and second input means, first resistor-capacitor network means connected between said first input means and a reference potential, first transformer means having a first winding and a center tapped second winding, one end of which is connected to said second input means, second resistor-capacitor network means connected between the other end of said second winding and said reference potential, a first AC signal source coupled to said first winding for applying a first signal to said semiconductor device, second transformer means having third and fourth windings, said third winding connected between said center tap and said reference potential, a second AC signal source coupled to said fourth winding for applying a second signal to said semiconductor device independently of said first signal.

10. A color demodulator according to claim 9 in which said semiconductor device is a transistor.

References Cited

UNITED STATES PATENTS

| | | | |
|---|---|---|---|
| 2,873,367 | 2/1959 | Zawels | 329—192 X |
| 2,897,379 | 7/1959 | Hinsdale | 307—232 |
| 3,184,608 | 5/1965 | Goldfarb | 307—232 |

RICHARD MURRAY, Primary Examiner

J. C. MARTIN, Assistant Examiner

U.S. Cl. X.R.

329—50